(12) United States Patent
Bouyat (10) Patent No.: US 12,436,000 B2
(45) Date of Patent: Oct. 7, 2025

(54) CAPACITIVE DISPLACEMENT SENSOR SYSTEM WITH INTERDIGITATED COMBS

(71) Applicant: THALES, Courbevoie (FR)

(72) Inventor: Stéphane Bouyat, Chatellerault (FR)

(73) Assignee: THALES, Courbevoie (FR)

( * ) Notice: Subject to any disclaimer, the term of this patent is extended or adjusted under 35 U.S.C. 154(b) by 358 days.

(21) Appl. No.: 18/008,933

(22) PCT Filed: Jun. 9, 2021

(86) PCT No.: PCT/EP2021/065395
§ 371 (c)(1),
(2) Date: Dec. 7, 2022

(87) PCT Pub. No.: WO2021/254839
PCT Pub. Date: Dec. 23, 2021

(65) Prior Publication Data
US 2023/0236039 A1 Jul. 27, 2023

(30) Foreign Application Priority Data
Jun. 18, 2020 (FR) ...................................... 2006374

(51) Int. Cl.
*G01D 5/24* (2006.01)
*G01B 7/14* (2006.01)
*G01D 5/241* (2006.01)

(52) U.S. Cl.
CPC ............. *G01D 5/2412* (2013.01); *G01B 7/14* (2013.01)

(58) Field of Classification Search
CPC ........... G01D 5/2412; G01D 5/24; G01B 7/14
See application file for complete search history.

(56) References Cited

U.S. PATENT DOCUMENTS

| 3,872,241 | A | * | 3/1975 | Adler | ..................... G11B 9/075 |
| | | | | | 369/126 |
| 9,797,750 | B2 | | 10/2017 | Moon et al. | |
| 10,520,313 | B2 | * | 12/2019 | Törmälehto | .......... G01C 19/574 |
| 2002/0011850 | A1 | | 1/2002 | Togashi et al. | |

(Continued)

FOREIGN PATENT DOCUMENTS

| EP | 0 354 386 A1 | 2/1990 | |
| EP | 3 252 429 A1 | 12/2017 | |
| WO | WO-2017136148 A1 * | 8/2017 | ............. G01D 5/145 |

*Primary Examiner* — Dominic E Hawkins
(74) *Attorney, Agent, or Firm* — BakerHostetler (57) ABSTRACT

A capacitive displacement sensor system with interdigitated combs, includes capacitive detection in a direction perpendicular to the surfaces of the combs facing one another, the combs being subjected to a sinusoidal movement in the direction, comprising: a device for converting the capacitance delivered by the sensor into a voltage; an analog/digital converter configured to digitize the voltage delivered by the conversion device, and supply a digitized signal; and a control unit comprising: a harmonic estimator configured to estimate the amplitudes of the harmonics of order less than or equal to a maximum order based on the digitized signal and a reference angle corresponding to the instantaneous angle of the input angular frequency; and a signal reconstruction module for reconstructing the signal from the amplitudes and the reference angle that are supplied by the harmonic estimator and from the digitized signal delivered by the analog/digital converter.

8 Claims, 5 Drawing Sheets

(56) References Cited

U.S. PATENT DOCUMENTS

2007/0256502 A1 11/2007 Aebersold et al.
2011/0255228 A1 10/2011 Kimura et al.
2012/0324999 A1* 12/2012 Ragot ................. H03M 1/1038
73/504.12

* cited by examiner

CAPACITIVE DISPLACEMENT SENSOR SYSTEM WITH INTERDIGITATED COMBS

CROSS-REFERENCE TO RELATED APPLICATIONS

This application is a National Stage of International patent application PCT/EP2021/065395, filed on Jun. 9, 2021, which claims priority to foreign French patent application No. FR 2006374, filed on Jun. 18, 2020, the disclosures of which are incorporated by reference in their entirety.

FIELD OF THE INVENTION

The invention relates to a capacitive displacement sensor system with interdigitated combs, comprising capacitive detection in a direction perpendicular to the surfaces of the combs facing one another, the combs being subjected to a sinusoidal movement in said direction.

The field of application of the invention is that of sensors using capacitive combs as detection or feedback means.

BACKGROUND

Many sensors use the capacitive effect to determine a measured quantity or inject a feedback force.

Figure 1:
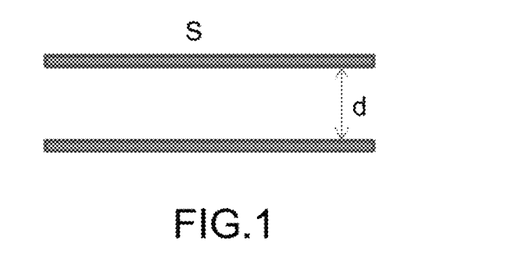
FIG. 1 schematically illustrates the elementary capacitance of a fixed surface facing a mobile surface, according to the prior art.

The elementary capacitance C generally consists of a fixed surface facing a mobile surface, as illustrated in FIG. 1, and may be expressed by the following relationship:

$$C = \varepsilon S/d$$

in which:
S represents the area of the surfaces facing one another;
d represents the inter-surface distance;
$\varepsilon$ represents the dielectric permittivity of the material.

In order to increase the surface area and therefore the efficiency thereof, these capacitances may be organized in the form of combs (two interdigitated combs). This arrangement also allows, beyond increasing the area of the surfaces facing one another, operation along two axes, in this case the x and y axes.

Figure 2:
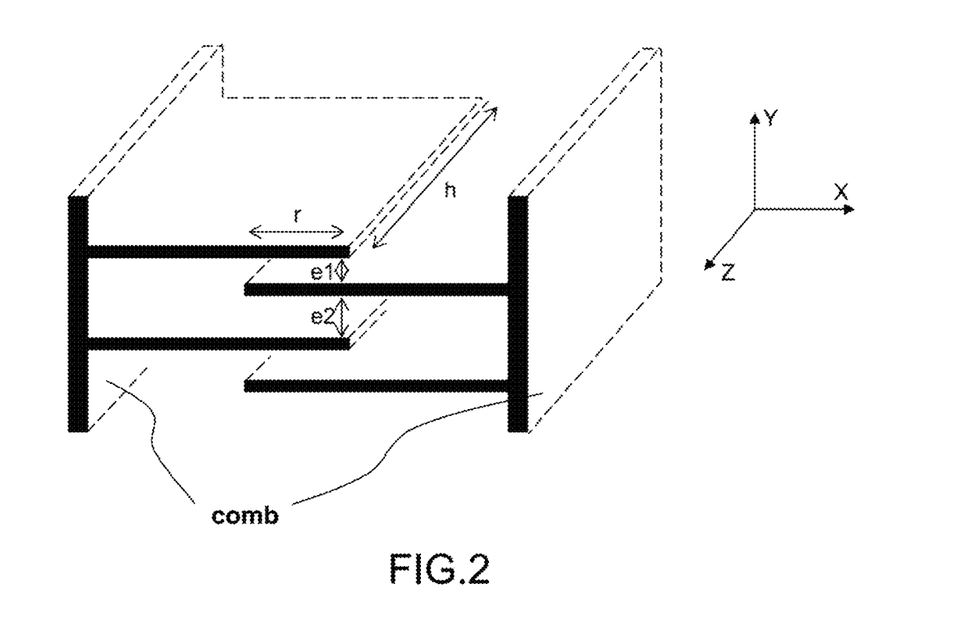
FIG. 2 schematically illustrates a capacitive displacement sensor with interdigitated combs, according to the prior art.

The following quantities are denoted, as illustrated in FIG. 2:
n: number of teeth of a comb (repetition of the unit pattern);
$e_1$: air gap 1, in m;
$e_2$: air gap 2 (may be equal to air gap 1 in case of a symmetrical design), in m;
r: overlap of the combs, in m;
h: depth of the teeth of the combs (along the z axis), in m.

The capacitance may thus be expressed by the following relationship:

$$C = \varepsilon.n.h.r.(1/e1 + 1/e2)$$

Thinking in terms of detection and as explained above, two types of displacement are possible:
displacement along the x axis: $r = r_0 + x$ ($r_0$ corresponding to the value of r at rest or in a position of equilibrium); and
displacement along the y axis: $e_1 = e1_0 + y$ ($e1_0$ corresponding to the value of e1 at rest or in a position of equilibrium) and $e2 = e2_{0-y}$ ($e2_0$ corresponding to the value of e2 at rest or in a position of equilibrium).

A displacement along the x axis therefore gives a linear relationship between x and the capacitance variation:

$$C = \varepsilon.n.h.r_0.(1/e1 + 1/e2) + c.n.h.x.(1/e1 + 1/e2), \text{ which may be denoted } C_0 + dC(x)$$

with $dC = k.x$, setting $k = \varepsilon.n.h.(1/e1 + 1/e2)$.

This operating scenario exhibits no difficulty in terms of processing information, the displacement along the x axis being directly and linearly contained within the capacitive variation signal.

Upon a displacement along the y axis, the capacitance may be expressed by:

$$C = \varepsilon.n.h.r.(1/(e1_0 + y) + 1/(e2_0 - y)).$$

Drawing a limit to a limited expansion of order 3 gives the following relationship:

$$C = \varepsilon.n.h.r.\ [e1_0^{-1}.(1 - y/e1_0 + y^2/e1_0^2 - y^3/e1_0^3) + e2_0^{-1}.(1 + y/e2_0 + y^2/e2_0^2 + y^3/e2_0^3)] \text{ which may be denoted } C_0 + dC(x)$$

This therefore gives $C = k10 + k11.y + k12.y^2 + k13.y^3 + k20 + k21.y + k22.y^2 + k23.y^3$ corresponding to $C_0 + dC(y)$ where:

$$C_0 = k1 + k20$$

$$dC = (k11 + k21).y + (k21 + k22).y^2 + (k31 + k32).y^3 = k1.y + k2.y^2 + k3.y^3; \text{ and}$$

$$k0 = \varepsilon.n.h.r/e1_0 + \varepsilon.n.h.r/e2_0$$

$$k1 = -\varepsilon.n.h.r/e1_0^2 + \varepsilon.n.h.r/e2_0^2$$

$$k2 = \varepsilon.n.h.r/e1_0^3 + \varepsilon.n.h.r/e2_0^3$$

$$k3 = -\varepsilon.n.h.r/e1_0^4 + \varepsilon.n.h.r/e2_0^4$$

It appears that utilizing the movement along the y axis results in the occurrence of harmonic terms. In some architectures, what are known as complementary combs are implemented, operating in phase opposition, that is to say that, when a capacitance increases on one side, that of the complementary side decreases. The displacement information is then obtained by subtracting the two complementary sides: this arrangement eliminates some common-mode defects and notably eliminates (or greatly reduces) even harmonic terms, but doubles the odd terms.

The presence of these harmonic terms may turn out to be detrimental in the case of processing operations relating to certain high-precision resonant sensors for which it is essential to have access to a true image of the mechanical displacement.

U.S. Pat. No. 9,797,750 describes a capacitive detection linearization method. This method uses four electrodes that produce signals with phases 0°, 90°, −90° and 180°. The signal is linearized by performing radiometric computations on quadrature signals.

In addition, the production of electrodes supplying signals at 90° may, depending on the architecture of the sensor, exhibit production difficulties. This document also does not justify the drop in linearization performance in the case of imperfection in the production of the sets of electrodes (that is to say degradation of the relative inter-electrode phases).

SUMMARY OF THE INVENTION

One aim of the invention is to overcome the problems cited above, and notably to allow correction through processing while retaining conventional electrodes.

What is therefore proposed, according to one aspect of the invention, is a capacitive displacement sensor system with interdigitated combs, comprising capacitive detection in a direction perpendicular to the surfaces of the combs facing one another, the combs being subjected to a sinusoidal movement in said direction, comprising:
a device for converting the capacitance delivered by the sensor into a voltage;

an analog/digital converter configured to digitize the voltage delivered by the conversion device, and supply a digitized signal; and a control unit comprising:

a harmonic estimator configured to estimate the amplitudes of the harmonics of order less than or equal to a maximum order based on the digitized signal and a reference angle corresponding to the instantaneous angle of the input angular frequency; and a signal reconstruction module for reconstructing the signal from the amplitudes and the reference angle that are supplied by the harmonic estimator and from the digitized signal delivered by the conversion device.

Such a system makes it possible to reconstruct the displacement signal stripped of its harmonics, giving better performance in the case of processing operations of what are known as "resonant" sensors, such as a microelectromechanical system (or Mems in acronym form) gyrometer.

According to one embodiment, the harmonic estimator comprises a phase-locked loop, locked to the digitized signal delivered by the analog/digital converter, delivering the reference angle, and an estimation module for estimating the amplitudes of the harmonics of order less than or equal to the maximum order.

It is thus possible to reuse the phase-locked loop that is often already present in the case of resonant sensor processing operations.

In one embodiment, the phase-locked loop comprises a phase comparator, a low-pass filter and loop corrector module, and a phase accumulator, all arranged in series, the phase comparator receiving, at input, the digitized signal and the reference angle delivered at the output of the phase accumulator, and delivering, at output, a phase error signal to the low-pass filter and loop corrector module, the low-pass filter and loop corrector module filtering the terms with high frequencies greater than a threshold and correcting the reference angle, delivering, at output, a frequency setpoint to the phase accumulator determining the reference angle by summing of elementary phase steps.

This thus gives a reference angle that may be used directly by the harmonic estimator.

According to one embodiment, the estimation module for estimating the amplitudes of the harmonics of order less than or equal to the maximum order comprises, for each harmonic amplitude, a first multiplier multiplying the reference angle by the order of the harmonic amplitude, a cosine module if the order is even or a sine module if the order is odd, receiving the output of the first multiplier at input, a second multiplier multiplying the output of the cosine or sine module by the digitized signal, and a low-pass filter having a static gain inverse to the trigonometric expansion coefficient, delivering the harmonic amplitude of the order.

This method thus remains highly economical by limiting the implementation surface, since it evaluates only the chosen harmonic terms.

In one embodiment, the signal reconstruction module comprises:

a sine module receiving the reference angle delivered by the harmonic estimator at input, and delivering its sine at output;

for each harmonic amplitude of order less than or equal to the maximum order, an increase module for increasing the sine of the reference angle to the power of the order, a third multiplier multiplying the output delivered by the increase module by the harmonic amplitude of the order delivered by the harmonic estimator;

an adder receiving the outputs of the third multipliers at input; and a subtractor configured to subtract the sum delivered by the adder from the digitized signal.

This method thus remains highly economical by limiting the implementation surface, since it evaluates only the chosen harmonic terms.

According to one embodiment, the system operates in closed-loop mode, comprising a feedback loop feeding back the reconstructed signal at output of the reconstruction module to the harmonic estimator.

Operation in closed-loop mode thus makes it possible to correct other harmonic defects that may be introduced, for example by the analog formatting chain, and thus eliminate the desired harmonic terms overall. In the same way, a temporal drift of the amplitude of the harmonic terms may be compensated for since operation in closed-loop mode continuously cancels out the selected harmonics.

In one embodiment, the reconstructed signal replaces the input signal at input of the second multipliers, and correctors having an integral function replace the low-pass filters.

In one embodiment, the maximum order is 3.

BRIEF DESCRIPTION OF THE DRAWINGS

The invention will be better understood on studying a few embodiments that are described by way of completely non-limiting examples and illustrated by the appended drawing, in which.

Throughout the figures, elements having identical references are similar.

DETAILED DESCRIPTION

Figure 3:
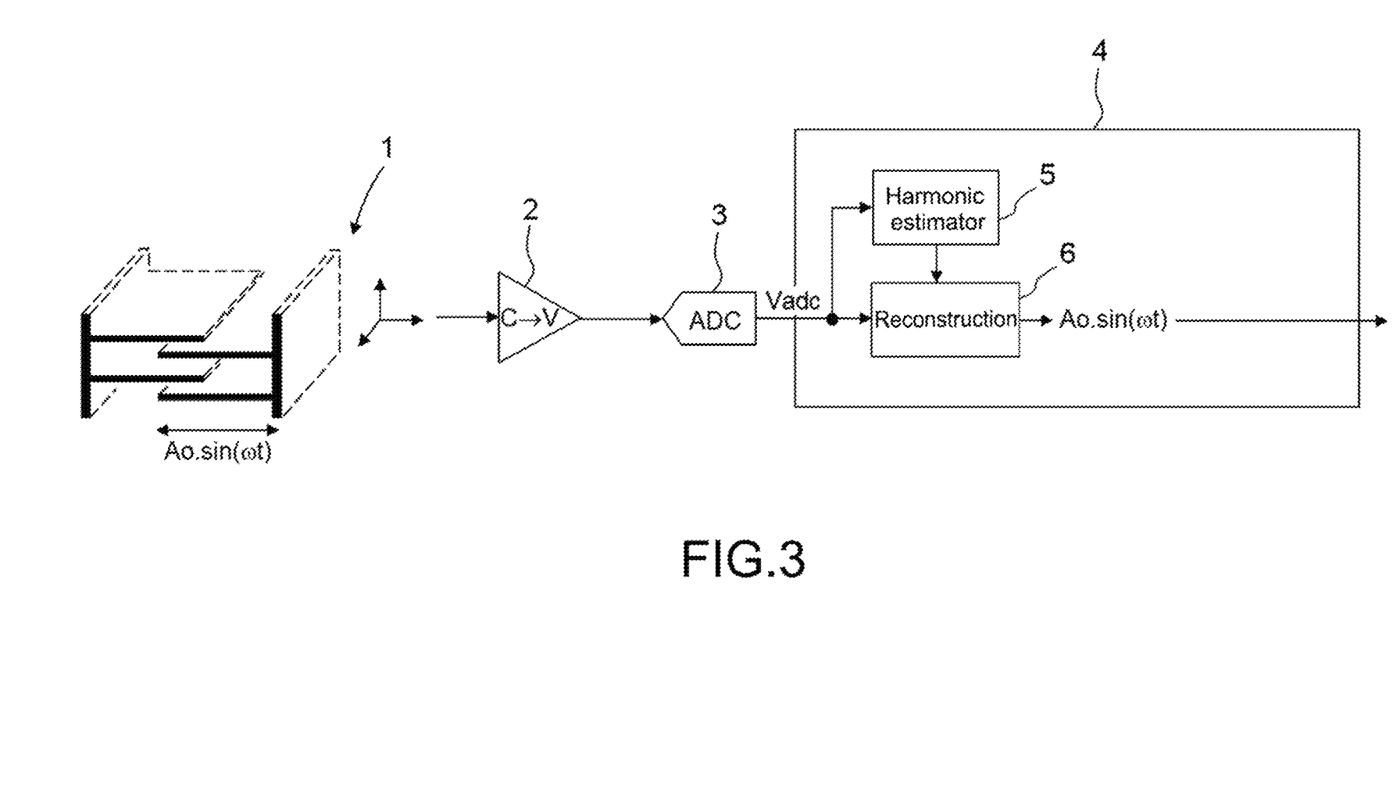
FIG. 3 schematically illustrates a capacitive displacement sensor system with interdigitated combs, according to one aspect of the invention.

FIG. 3 illustrates, according to one aspect of the invention, a capacitive displacement sensor system 1 with interdigitated combs, comprising capacitive detection in a direction y perpendicular to the surfaces of the combs facing one another, the combs being subjected to a sinusoidal movement $A_0.\sin(\omega t)$ in said direction y, comprising a device 2 for converting the capacitance delivered by the sensor 1 into a voltage;

an analog/digital converter 3, or ADC in acronym form, configured to digitize the voltage V delivered by the conversion device 2, and supply a digitized signal Vadc; and a control unit 4 comprising:

a harmonic estimator 5 configured to estimate the amplitudes of the harmonics of order less than or equal to a maximum order based on the digitized signal Vadc and a reference angle a corresponding to the instantaneous angle of the input angular frequency $\alpha=\omega t$; and a signal reconstruction module 6 for reconstructing the signal from the amplitudes and the reference angle $\alpha$ that are supplied by the harmonic estimator 5 and from the digitized signal Vadc delivered by the converter 3.

Consideration will be given to capacitive detection operating along the y axis and subjected to a sinusoidal mechanical movement $A_0.\sin(\omega t)$. The electrical signal that is the image of the capacitance variation is affected by harmonic defects, as presented above. Other harmonic defects may be added by the device for converting capacitance C into voltage V (such as a charge amplifier). The information processing chain may be summarized as follows:

the combs are subjected to a sinusoidal movement along the y axis;

the capacitance delivered by the sensor 1 (charge amplifier, switched capacitors or other similar devices) is converted 2 into a voltage, followed by an analog/digital conversion 3;

the digital information Vadc is then processed in an electronic control unit 4 comprising the harmonic estimator 5 and the signal reconstruction module 6.

The idea is to estimate the harmonic terms in order to be able to recover the initial displacement signal from the sensor combs. In the remainder of the description, consideration will be given to the harmonics of order 2 and of order 3, but without limitation, since the invention may be applied to higher harmonics in the same way.

It is considered that converting (with amplification) a capacitance into a voltage eliminates the DC component (DC being the acronym for direct current, corresponding to the term k0).

The higher-order terms encompass the transfer function of the conversion device 2 and of the converter 3, and $A_0=1$ is adopted to simplify the equations, but without limitation.

The digitized signal Vadc, due to the non-linearities of the combs, is of the following form:

$$Vadc=k1.\sin(\omega t)+k2.[\sin(\omega t)]^2+k3.[\sin(\omega t)]^3$$

However, since $\sin^2(\omega t)=[1-\cos(2\omega t)]/2$ and $\sin^3(\omega t)=[3\sin(\omega t)-\sin(3\omega t)]/4$, the following relationship is obtained:

$$Vadc=[k1+\tfrac{3}{4}.k3].\sin(\omega t)+[-\tfrac{1}{2}.k2].\cos(2\omega t)+[-\tfrac{1}{4}k3].\sin(3\omega t)$$

The DC component term relating to the coefficient k2 is not retained as it has been assumed that the capacitance to voltage conversion (C→V) does not retain the DC component.

Terms in $\cos(2\omega t)$ and $\sin(3\omega t)$ appear, these being weighted by non-linearities of orders 2 and 3. A first embodiment of the estimation of the harmonics could be a DFT or FFT that makes it possible, based on the three lines at $\omega t$, $2\omega t$ and $3\omega t$, to return to the coefficients k2 and k3. Although this approach may be adopted, it exhibits the drawback of requiring performing a DFT or FFT that, if precision is desirable, may prove to be greedy from an implementation viewpoint (silicon surface, computing time).

Figure 4:
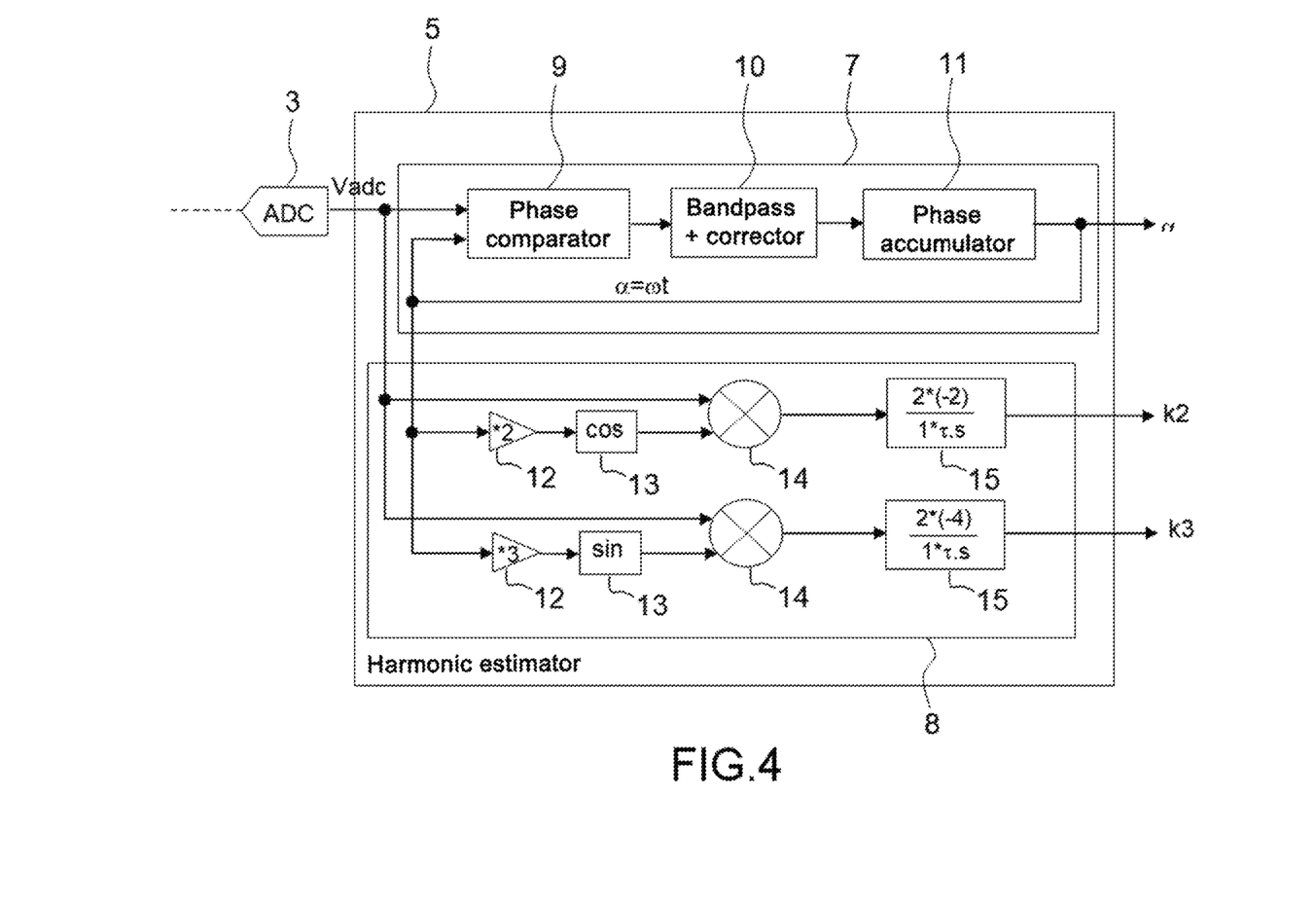
FIG. 4 schematically illustrates a capacitive displacement sensor system with interdigitated combs, according to one aspect of the invention.

As illustrated in FIG. 4, the harmonic estimator 5 comprises a phase-locked loop 7, locked to the digitized signal Vadc delivered by the analog/digital converter 3, delivering the reference angle $\alpha$, and an estimation module 8 for estimating the amplitudes of the harmonics of order less than or equal to the maximum order.

The approach that is adopted is to use a phase-locked loop 7, or PLL in acronym form, locked to the signal coming from the analog/digital converter 3.

The phase-locked loop 7 comprises a phase comparator 9, a low-pass filter and loop corrector module 10, and a phase accumulator 11, all arranged in series, the phase comparator 9 receiving, at input, the digitized signal Vadc and the reference angle a delivered at the output of the phase accumulator 11, and delivering, at output, a phase error signal EP to the low-pass filter and loop corrector module 10, the low-pass filter and loop corrector module 10 filtering the terms with high frequencies greater than a threshold and correcting the reference angle, delivering, at output, a frequency setpoint to the phase accumulator determining the reference angle by summing of elementary phase steps.

The output of the phase accumulator is therefore the instantaneous angle of the input angular frequency $\alpha=\omega t$.

With the presence of the PLL 7, it is possible to carry out a coherent demodulation of the input signal Vadc, this being equivalent to carrying out the discrete Fourier transform, or DFT in acronym form, only for the frequencies of interest. The amplitude ratio of the fundamental, in combination with the loop filter of the PLL, allows the PLL to be phase-locked to the fundamental.

Moreover, the locked angle $\alpha$ is taken as a basis for easily creating the signals $2\alpha$ and $3\alpha$, and then the terms $\cos(2\omega t)$ and $\sin(3\omega t)$.

The estimation module 8 for estimating the amplitudes of the harmonics of order less than or equal to the maximum order comprises, for each harmonic amplitude (in this case of order 2 and of order 3), a first multiplier 12 multiplying the reference angle a by the order of the harmonic amplitude, a cosine module 13 if the order is even or a sine module if the order is odd, receiving the output of the first multiplier 12 at input, a second multiplier 14 multiplying the output of the cosine or sine module 13 by the digitized signal Vadc, and a low-pass filter 15 having a static gain inverse to the trigonometric expansion coefficient, delivering the harmonic amplitude ki of the order i.

This harmonic estimator 5 constitutes the part estimating the harmonics. Its principle is not limited to orders 2 and 3; it may be extended to higher orders.

In the case of a harmonic estimation of the terms of orders 2 and 3, the reference signals $\cos(2\omega t)$ and $\sin(3\omega t)$ are multiplied by the digitized input signal Vadc. This is equivalent to estimating the power of the terms of order 2 and 3 by returning these levels to DC current:

low-pass filtering makes it possible to retain the DC portion and to filter the high-frequency terms;

a gain of 2 makes it possible to compensate for the factor ½ due to the multiplication of the two sinusoidal terms; and the gains of −2 or −4 make it possible to compensate for the harmonic gains (cf. equation $Vadc=[k1+\tfrac{3}{4}.k3].\sin(\omega t)+[-\tfrac{1}{2}k2].\cos(2\omega t)+[-\tfrac{1}{4}.k3].\sin(3\omega t)$).

This method makes it possible to dynamically estimate the terms k2 and k3 of the harmonic levels.

Figure 5:
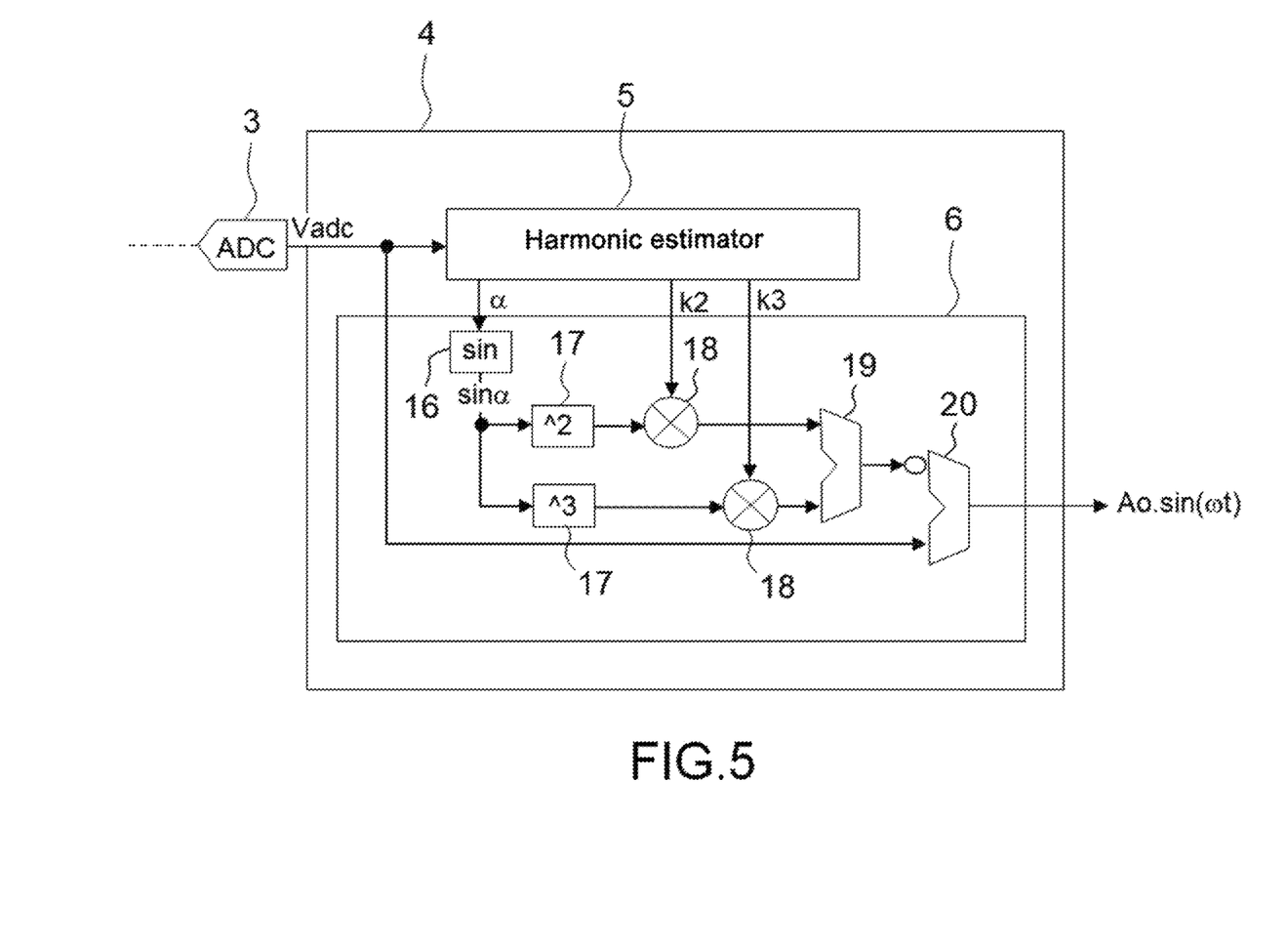
FIG. 5 schematically illustrates a capacitive displacement sensor system with interdigitated combs, according to one aspect of the invention.

As illustrated in FIG. 5, the signal reconstruction module comprises:

a sine module 16 receiving the reference angle $\alpha$ delivered by the harmonic estimator 5 at input, and delivering its sine at output;

for each harmonic amplitude of order less than or equal to the maximum order, an increase module 17 for increasing the sine of the reference angle to the power of the order, a third multiplier 18 multiplying the output delivered by the increase module 17 by the harmonic amplitude k2, k3 of the order delivered by the harmonic estimator 5;

an adder 19 receiving the outputs of the third multipliers 18 at input; and a subtractor 20 configured to subtract the sum delivered by the adder 19 from the digitized signal Vadc.

The outputs of the harmonic estimator 5 are then used by the reconstruction module 6 intended to reconstruct the linearized signal, as illustrated in FIG. 5.

The reference angle α makes it possible to recreate the terms $[\sin(\omega t)]^2$ and $[\sin(\omega t)]^3$. The principle of inverse harmonic correction consists in weighting these terms by the harmonic estimates k2 and k3 in order to subtract them from the input signal. This thus reconstructs the original movement signal Ao.sin(ωt), which may be utilized in the rest of the signal processing. This principle may easily be extended to higher harmonic orders, or limited to a particular harmonic order.

It should be noted that such a method is based on a ½ and ¾ weighting of the harmonic terms (Vadc=[k1+¾.k3].sin(ωt)+[−½k2].cos(2ωt)+[−¼.k3].sin(3ωt)). This weighting is reused inversely by the harmonic estimator 5 to obtain the coefficients k2 and k3.

More generally, this device may be considered to be in "open-loop mode", with a bias or an imperfection in the processing stages possibly leading to an error in the estimation of the terms k2 and k3 (quantization imperfections, computation resolutions, etc.). This is all the more true when the manipulated amplitudes remain low with respect to the fundamental signal.

Figure 6:
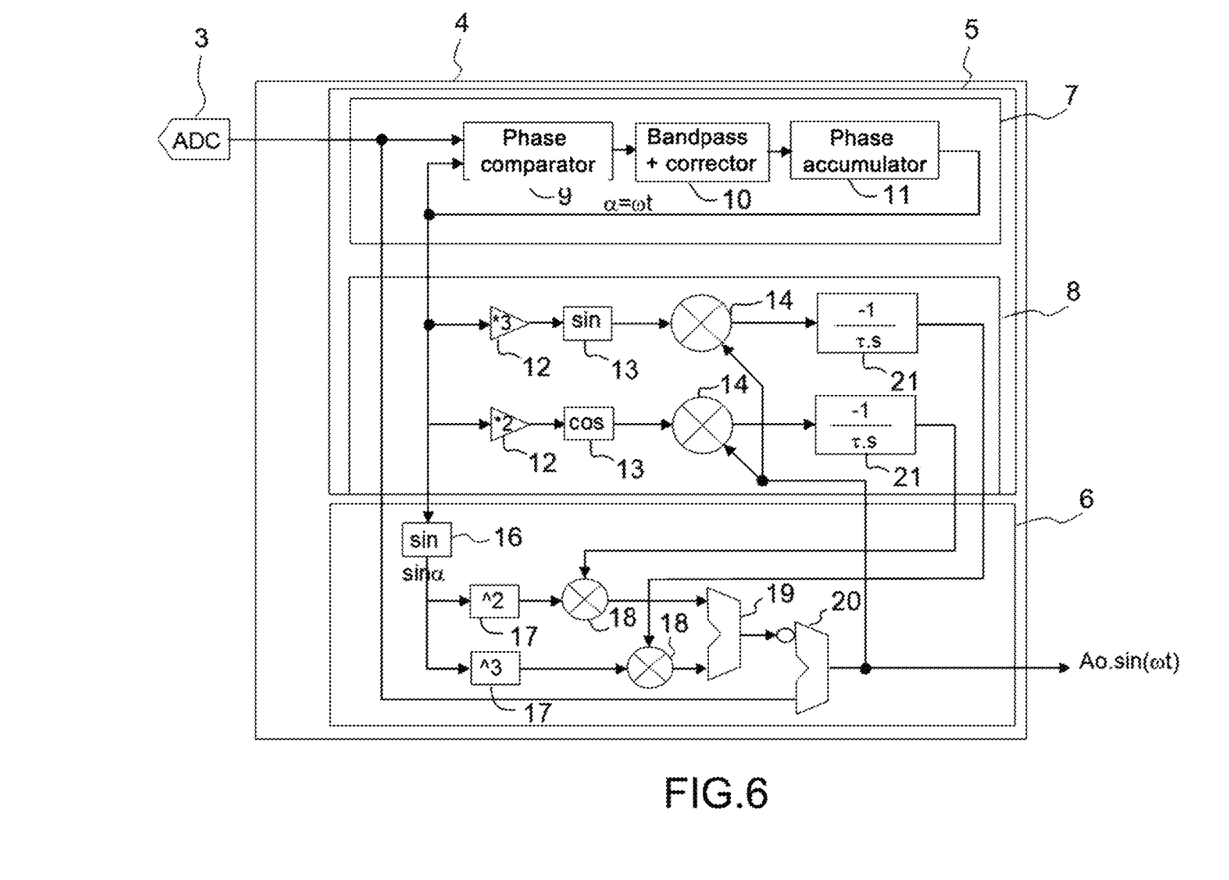
FIG. 6 schematically illustrates a capacitive displacement sensor system with interdigitated combs, according to one aspect of the invention.

It is then possible to contemplate, as illustrated in FIG. 6, an alternative in "closed-loop mode", comprising a feedback loop feeding back the reconstructed signal A0 sin(ωt) at output of the reconstruction module 6 to the harmonic estimator 5.

This alternative implements two integrators 21 in the harmonic estimation portion and uses the linearized output information. The harmonic estimator 5 thus seeks directly to cancel out the harmonic terms on the output signal, and makes it possible to dynamically eliminate the targeted harmonic terms.

In the same way, this device in "closed-loop mode" may be extended to higher harmonic orders, or limited to a particular harmonic order, for example order 3.

The system makes it possible to totally eliminate the chosen harmonic terms due to the fact that it may be implemented in the form of a looped system: in this regard, this system makes the entire detection chain totally linear, including the electronic signal formatting stages, which may also add non-linearities resulting in harmonic terms: the performance of the detection stage as a whole is thus improved.

Another advantage of the present invention consists in directly utilizing the main signal, without requiring the addition of complementary signals and formatting thereof.

The invention claimed is:

1. A capacitive displacement sensor system with interdigitated combs, comprising capacitive detection in a direction (y) perpendicular to the surfaces of the combs facing one another, the combs being subjected to a sinusoidal movement ($A_0.\sin(\omega t)$) in said direction (y), comprising:

a device for converting the capacitance delivered by the sensor into a voltage;

an analog/digital converter configured to digitize the voltage delivered by the device for converting, and supply a digitized signal (Vadc); and a control unit comprising:

a harmonic estimator configured to estimate the amplitudes of the harmonics of order less than or equal to a maximum order based on the digitized signal (Vadc) and an instantaneous reference angle (α) corresponding to an input; and a signal reconstruction module for reconstructing a signal from the amplitudes and the instantaneous reference angle that are supplied by the harmonic estimator and from the digitized signal delivered by the analog/digital converter.

2. The system as claimed in claim 1, wherein the harmonic estimator comprises a phase-locked loop, locked to the digitized signal (Vadc) delivered by the analog/digital converter, delivering the instantaneous reference angle (α), and an estimation module for estimating the amplitudes (k2, k3) of the harmonics of order less than or equal to the maximum order.

3. The system as claimed in claim 2, wherein the phase-locked loop comprises a phase comparator, a low-pass filter and loop corrector module, and a phase accumulator, all arranged in series, the phase comparator receiving, at input, the digitized signal (Vadc) and the instantaneous reference angle (α) delivered at the output of the phase accumulator, and delivering, at output, a phase error signal (EP) to the low-pass filter and loop corrector module, the low-pass filter and loop corrector module filtering the terms with high frequencies greater than a threshold and correcting the reference angle, delivering, at output, a frequency setpoint to the phase accumulator determining the reference angle by summing of elementary phase steps.

4. The system as claimed in claim 2, wherein the estimation module for estimating the amplitudes (k2, k3) of the harmonics of order less than or equal to the maximum order comprises, for each harmonic amplitude, a first multiplier multiplying the instantaneous reference angle (α) by the order of the harmonic amplitude, a cosine module if the order is even or a sine module if the order is odd, receiving the output of the first multiplier at input, a second multiplier multiplying the output of the cosine or sine module by the digitized signal (Vadc), and a low-pass filter having a static gain inverse to the trigonometric expansion coefficient, delivering the harmonic amplitude (ki) of the order (i).

5. The system as claimed in claim 4, operating in closed-loop mode, comprising a feedback loop feeding back the reconstructed signal (A0 sin (ωt)) at output of the reconstruction module to the harmonic estimator, wherein the reconstructed signal replaces the input signal at input of the second multipliers, and wherein correctors having an integral function replace the low-pass filters.

6. The system as claimed in claim 1, wherein the signal reconstruction module comprises:

a sine module receiving the instantaneous reference angle (α) delivered by the harmonic estimator at input, and delivering its sine at output;

for each harmonic amplitude of order less than or equal to the maximum order, an increase module for increasing the sine of the reference angle to the power of the order, a third multiplier multiplying the output delivered by the increase module by the harmonic amplitude (k2, k3) of the order delivered by the harmonic estimator;

an adder receiving the outputs of the third multipliers at input; and a subtractor configured to subtract the sum delivered by the adder from the digitized signal (Vadc).

7. The system as claimed in claim 1, operating in closed-loop mode, comprising a feedback loop feeding back the reconstructed signal (A0 sin (ωt)) at output of the reconstruction module to the harmonic estimator.

8. The system as claimed in claim 1, wherein the maximum order is 3.

* * * * *